US012599973B2

(12) United States Patent
Nishimiya

(10) Patent No.: US 12,599,973 B2
(45) Date of Patent: Apr. 14, 2026

(54) STRUCTURE AND CHUCK

(71) Applicant: KITAGAWA IRON WORKS CO., LTD., Fuchu (JP)

(72) Inventor: Tamio Nishimiya, Fuchu (JP)

(73) Assignee: Kitagawa Iron Works Co., Ltd., Hiroshima (JP)

( * ) Notice: Subject to any disclaimer, the term of this patent is extended or adjusted under 35 U.S.C. 154(b) by 542 days.

(21) Appl. No.: 17/634,756

(22) PCT Filed: Sep. 17, 2020

(86) PCT No.: PCT/JP2020/035227
§ 371 (c)(1),
(2) Date: Feb. 11, 2022

(87) PCT Pub. No.: WO2021/054388
PCT Pub. Date: Mar. 25, 2021

(65) Prior Publication Data
US 2022/0274187 A1 Sep. 1, 2022

(30) Foreign Application Priority Data
Sep. 18, 2019 (JP) ................................. 2019-169031

(51) Int. Cl.
*B23B 31/16* (2006.01)

(52) U.S. Cl.
CPC .. *B23B 31/16279* (2013.01); *B23B 31/16283* (2013.01); *B23B 31/16* (2013.01);
(Continued)

(58) Field of Classification Search
CPC .............. B23B 31/16; B23B 31/16279; B23B 31/16283; B23B 2260/132
See application file for complete search history.

(56) References Cited

U.S. PATENT DOCUMENTS 2,667,358 A 1/1954 Highberg
4,960,285 A 10/1990 Doi
(Continued)

FOREIGN PATENT DOCUMENTS

CN 1836812 A 9/2006
JP 04-201006 A 7/1992
(Continued)

OTHER PUBLICATIONS

Office Action issued on Mar. 6, 2024, in corresponding Chinese Application No. 202080057582.0, 15 pages.
(Continued)

*Primary Examiner* — Sunil K Singh
*Assistant Examiner* — Eric Daniel Whitmire
(74) *Attorney, Agent, or Firm* — Maier & Maier, PLLC

(57) ABSTRACT

A structure that is mounted to industrial equipment. This structure includes a jig, a first fixing member and a second fixing member, and a grip part. The industrial equipment has an attachment/detachment region for attaching and detaching the jig. The attachment/detachment region has a first space. The jig has a second space. The first fixing member is accomodatable in the first space. The second fixing member is accomodatable in the second space. The second fixing member is configured so that the jig can be attached to and detached from the attachment/detachment region by adjusting the degree of helical engagement of the first and second fixing members. The grip part is provided to at least one of the first fixing member and the second fixing member, and is configured grippable such that, in a state in which the degree of helical engagement has been loosened, the structure can smoothly be moved.

10 Claims, 13 Drawing Sheets

(52) U.S. Cl.
CPC ... *B23B 2260/132* (2013.01); *Y10T 279/1986*
(2015.01); *Y10T 279/1993* (2015.01)

(56)                     References Cited

U.S. PATENT DOCUMENTS

| | | | |
|---|---|---|---|
| 5,735,534 | A | 4/1998 | Edwards |
| 6,264,210 | B1 | 7/2001 | Difasi et al. |
| 2006/0208433 | A1 | 9/2006 | Cachod |
| 2013/0333533 | A1* | 12/2013 | D'Ancona ................ B23B 3/14 |
| | | | 82/166 |
| 2015/0209872 | A1* | 7/2015 | Chang .................... B23B 31/32 |
| | | | 279/139 |

FOREIGN PATENT DOCUMENTS

| | | | |
|---|---|---|---|
| JP | 10-086005 | A | 4/1998 |
| JP | 11-300509 | A | 11/1999 |
| JP | 2012218117 | A | 11/2012 |
| TW | I671148 | B | 9/2019 |
| WO | 2019107142 | A1 | 6/2019 |

OTHER PUBLICATIONS

Extended European Search Report issued on Oct. 24, 2022, in corresponding European Application No. 20865546.4, 12 pages.
International Search Report issued on Dec. 1, 2020 in corresponding International Application No. PCT/JP2020/035227; 7 pages.

* cited by examiner

FIG.9

STRUCTURE AND CHUCK

TECHNICAL FIELD

The present invention relates to a structure and a chuck.

BACKGROUND

In industrial machinery and other fields, there are situations where a predetermined upper jig (also understood as a part of an industrial machine) is attached to/detached from the industrial machine according to an object to be processed. Patent Document 1 discloses a chuck grasping a work at front of a body, and for such a chuck, it is necessary to change the top jaw, which is an upper jig, according to the work.

PATENT DOCUMENT

[Patent Document 1] Patent Application Publication No. H10-086005

SUMMARY

Not limited to chuck, when attaching an upper jig, a set of fixing members (first and second fixing members) having male and female screw structures are screwed together. On the contrary, when detaching the upper jig, it is performed by loosening the screw. In such attachment/detachment, instead of being all separated, the upper jig and the set of fixing members are often integrally treated as a structure.

However, when performing attachment and detachment, it is necessary to loosen screwed state between the set of fixing members, which results in a lot of gaps in the structure. For instance, there will be a gap between the upper jig and the second fixing member (e.g., a screw head of a bolt in the case of a chuck) inserted therethrough. As a result, a relative positional relationship between the upper jig and the first fixing member (e.g., a T-nut in the case of a chuck) also becomes unstable. Specifically, even if the bolt is loosened, only the bolt may separate while the upper jig may not, or the upper jig may tilt within a range of backlash. Therefore, when grasping the upper jig for attachment/detachment, positioning of the second fixing member to the industrial machine is difficult, which places a heavy burden on an operator.

In light of the above circumstances, the present invention provides a structure capable of suppressing difficulty of positioning and smoothly attaching/detaching an upper jig.

According to one aspect of the present invention, there is provided a structure configured to be used by attaching to an industrial machine. The structure comprises an upper jig, first and second fixing members, and a grasping portion. The industrial machine has an attachment/detachment area for attaching/detaching the upper jig. The attachment/detachment area has a first space. The upper jig has a second space. The first fixing member is configured to be accommodated in the first space. The second fixing member is configured to be accommodated in the second space. The second fixing member is configured in such a manner that the upper jig is attached to/detached from the attachment/detachment area by adjusting screw degree of the first and second fixing members. The grasping portion is provided on at least one of the first and second fixing members, and is configured to be graspable in such a manner that the structure can be smoothly moved in a state where the screw degree is loosened.

The structure of the present invention comprises the grasping portion on at least one of the first and second fixing members. Therefore, the structure is allowed to move smoothly by grasping the grasping portion in a state where the screw degree is loosened.

BRIEF DESCRIPTION OF DRAWINGS

FIG. 9 is a top plan view of the structure according to the first embodiment.

DETAILED DESCRIPTION

Hereinafter, embodiments of the present invention will be described with reference to the drawings. Various features described in the embodiment below can be combined with each other. For simplicity, an example of attaching/detaching a structure is described below, where an industrial machine is a chuck grasping a work at front of a body.

1. First Embodiment

Figure 1:
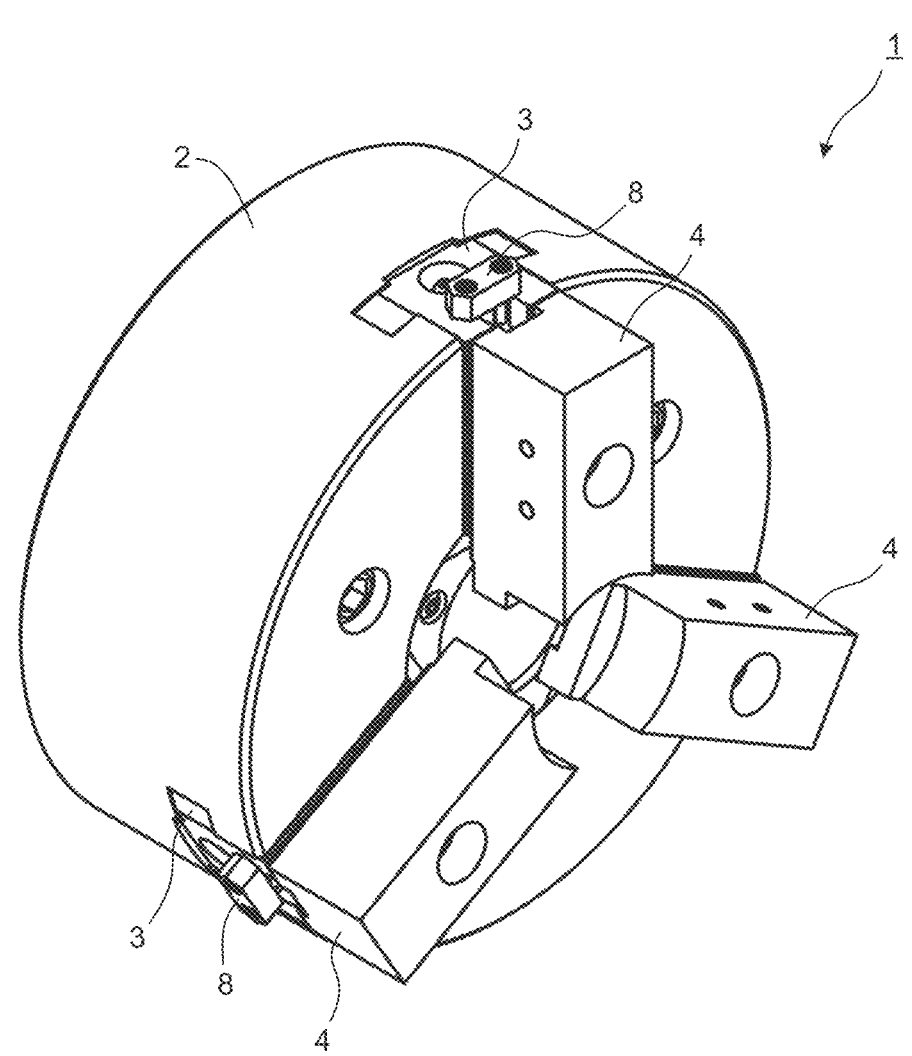
FIG. 1 is a perspective view of a chuck according to a first embodiment.
Figure 2:
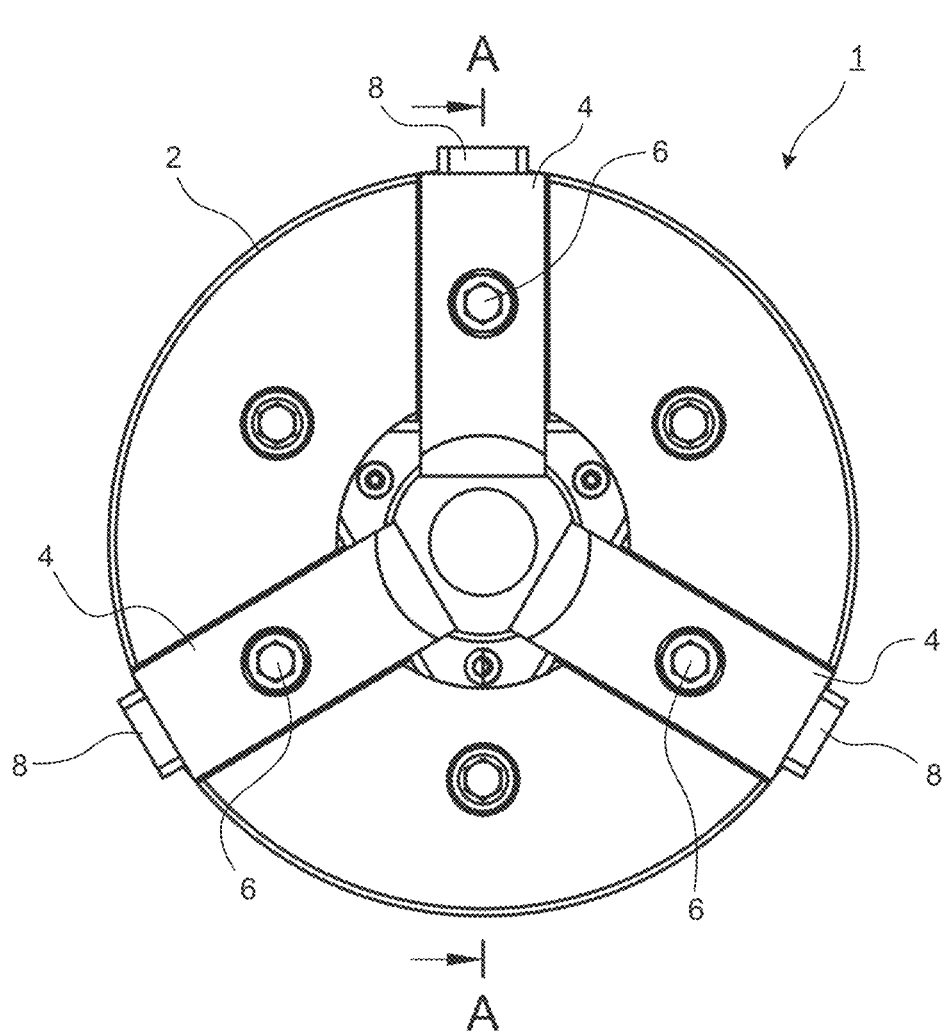
FIG. 2 is a front elevation view of the chuck according to the first embodiment.
Figure 3:
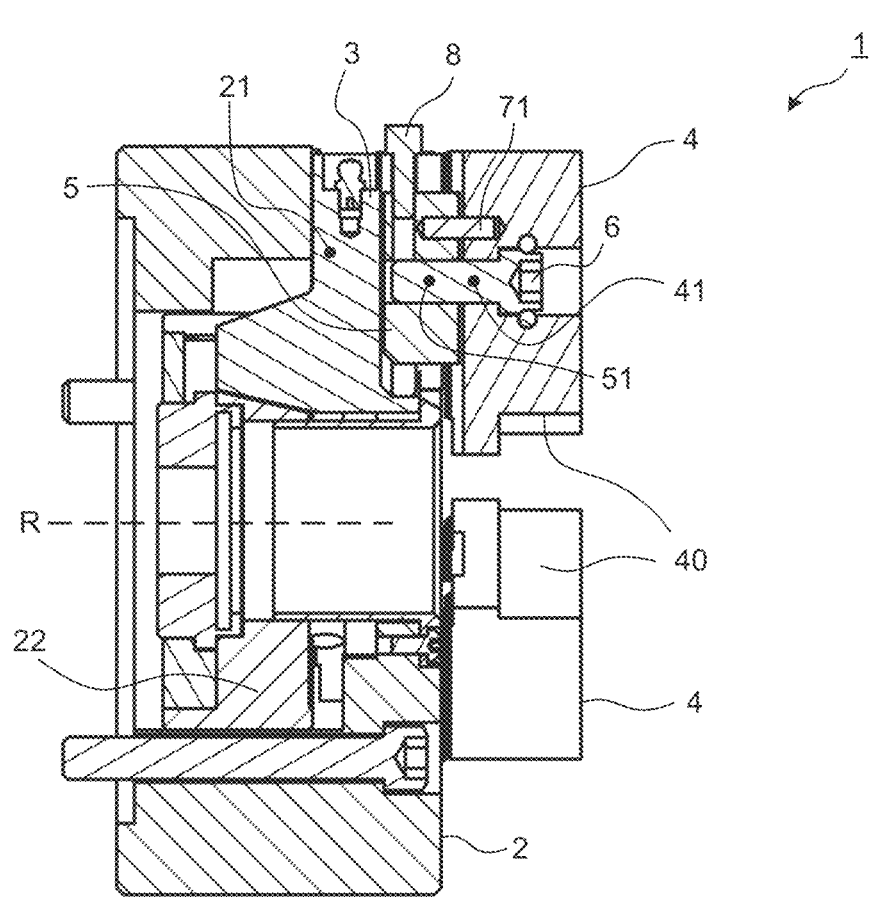
FIG. 3 is a cross-sectional view along line A-A in FIG. 2.

In section 1, a structure ST and a chuck 1 according to the first embodiment will be described. FIG. 1 is a perspective view of the chuck 1 according to the first embodiment. FIG. 2 is a front elevation view of the chuck 1 according to the first embodiment. FIG. 3 is a cross-sectional view along line A-A in FIG. 2.

1.1 Overall Structure

The chuck 1, which is an industrial machine, comprises a body 2, an attachment/detachment area, and the structure ST attached to the attachment/detachment area. In other words, it can be said that the chuck 1 grasping a work at front of a body comprises the structure ST, which is configured to be attachable/detachable. Specifically, the attachment/detachment area is a plurality of master jaws 3 configured to open/close in a radial direction of the chuck (to be described later). Further, the structure ST comprises an upper jig, first and second fixing members, and a grasping portion 8. The upper jig is a plurality of top jaws 4 configured to attach to/detach from the master jaw 3. The first fixing member is a T-nut 5 having an inverted T-shape, and the second fixing member is a top jaw bolt 6. These specific components will be described in more detail hereinafter.

<Body 2>

The body 2 is used with a rear side thereof fixed to an industrial machine (machine tool) such as a lathe in such a manner that a front side of the body 2 is orthogonal to a rotation axis R. When indicating direction in the following description, front side, rear side, direction of rotation axis (direction in which the rotation axis R extends), circumferential direction (direction around the rotation axis R), radial direction (direction of its radius around the rotation axis R), or the like are used according to the direction as appropriate. The body 2 comprises a guide groove 21 provided along the radial direction at the front side thereof, and the master jaw 3 is accommodated in the guide groove 21. Inside the body 2, a plunger 22 is provided that can move in axial direction of the rotation axis R.

<Master Jaw 3>

In the present embodiment, although it is described as having three master jaws 3, depending on shape of the work to be grasped, grasping method, size of the chuck 1, size of the top jaw 4, etc., it may be implemented with a pair or more than four master jaws 3. In particular, it should be noted that the chuck 1 has the master jaw 3 arranged at each of three equal positions viewed from front side (see FIG. 2). Since they are identical, only one of the positions will be described. The same applies to the top jaw 4, the T-nut 5, and the top jaw bolt 6 corresponding to the master jaw 3.

As shown in FIGS. 1 and 3, the master jaw 3 is accommodated in the guide groove 21 in the body 2. As a result, the master jaw 3 is configured to open/close in a radial direction along the guide groove 21. Specifically, the internal components of the body 2 are correlatively arranged in such a manner that translational movement of the plunger 22 in direction of the rotation axis can be converted into translational movement of the master jaw 3 in the radial direction. Such internal components are not particularly limited.

Figure 4A:
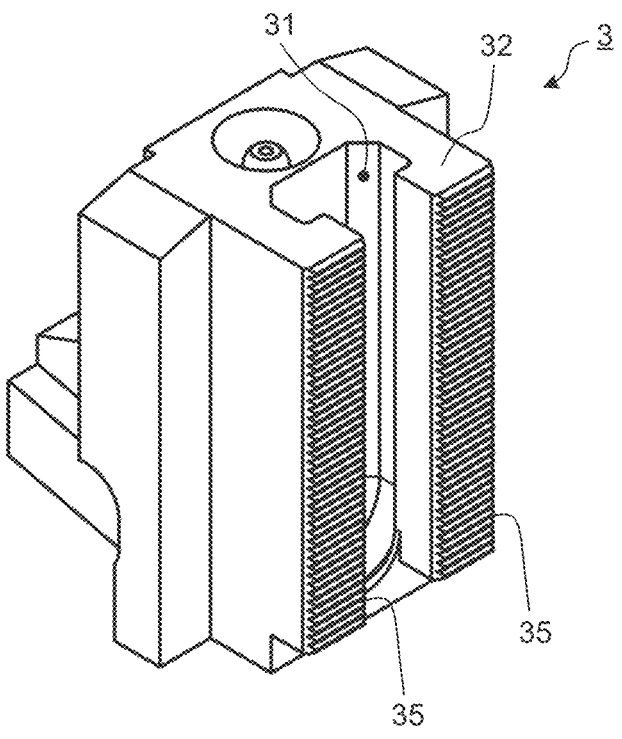
FIG. 4A is a front perspective view of a master jaw.
Figure 4B:
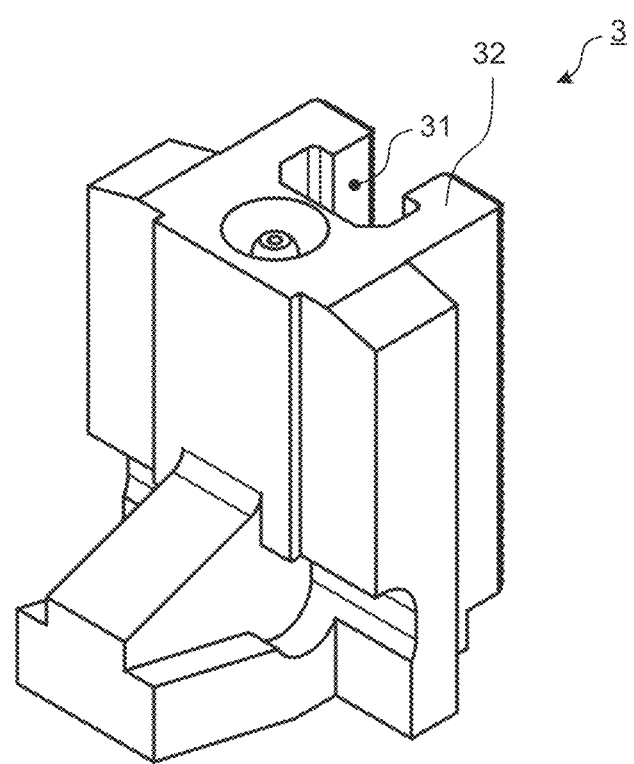
FIG. 4B is a rear perspective view of the master jaw.

FIG. 4A shows a front perspective view of the master jaw 3, and FIG. 4B shows a rear perspective view of the master jaw 3. That is, the chuck 1 has a first space in the master jaw 3 for attaching/detaching the top jaw 4. The first space is a T-groove 31, which has an inverted T-shape and accommodates the T-nut 5. As a result, the T-nut 5 is configured to insert into the T-groove 31 in the master jaw 3. Further, the master jaw 3 has a serration 35 in which peaks and valleys are alternately continuous. Pitch value of the serration 35 is, for example, 0.5 to 5.0 mm, and is configured to be the same as pitch of a serration 45 in the top jaw 4 described later. Further, the master jaw 3 comprises the inverted T-shaped T-groove 31 into which the T-nut 5 can be inserted.

<Top Jaw 4>

Figure 5A:
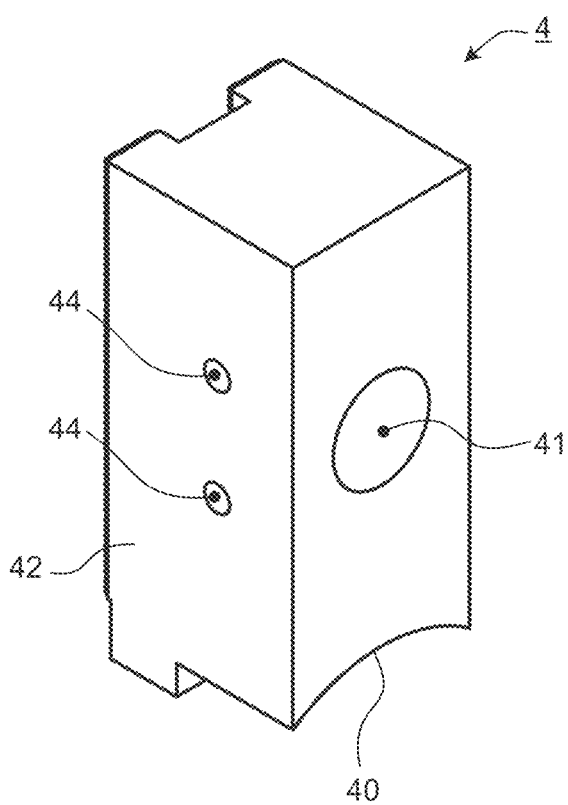
FIG. 5A is a front perspective view of a top jaw.
Figure 5B:
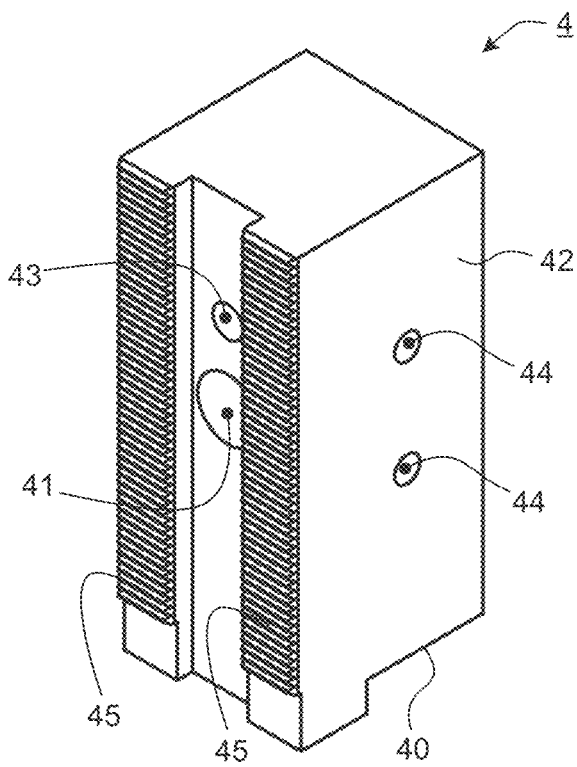
FIG. 5B is a rear perspective view of the top jaw.

FIG. 5A is a front perspective view of the top jaw 4, and FIG. 5B is a rear perspective view of the top jaw 4. The top jaw 4 comprises a grasping surface 40, and is configured to grasp work (not shown), which is a desired work object, with the grasping surface 40 by attaching to the master jaw 3. In the first embodiment, the top jaw 4 is shown in a state in which the grasping surface 40 is machined at a position close to center side. On the other hand, the grasping surface 40 can be machined on outer peripheral side according to a larger work (e.g., see second and third embodiments).

The top jaw 4 has a second space. The second space is a through hole 41 allowing the top jaw bolt 6 to penetrate. More specifically, the top jaw 4 has the through hole 41 allowing the top jaw bolt 6 to insert into front view or rear view of the top jaw 4. In addition, the top jaw 4 has a pin hole 43 for inserting an anti-rotation member 71 (pin) in the rear view of the top jaw 4. Moreover, a width across flat 42 of the top jaw 4 has two pin hole 44 allowing a locking member 72 (pin) along a direction approximately vertical to an insert direction (axial direction) of the top jaw bolt 6. Number of the pin hole is not particularly limited. These will be described again.

Further, as shown in FIG. 5B, the top jaw 4 comprises the serration 45 having the same pitch value as the serration 35. That is, the chuck 1 can adjust a relative position of the serration 35 and the serration 45 in pitch units by engaging peaks and valleys of the serrations 35 and the serration 45 with each other. A direction in which the peaks and valleys are continuous is an adjustment direction for adjusting position of the top jaw 4. After determining a relative position of the master jaw 3 and the top jaw 4 by the serration 35 and the serration 45, the relative position of the top jaw 4 associated with the master jaw 3 can be fixed by screwing the top jaw bolt 6 into the T-nut 5 described later.

<T-nut 5 and Top Jaw Bolt 6>

Figure 6A:
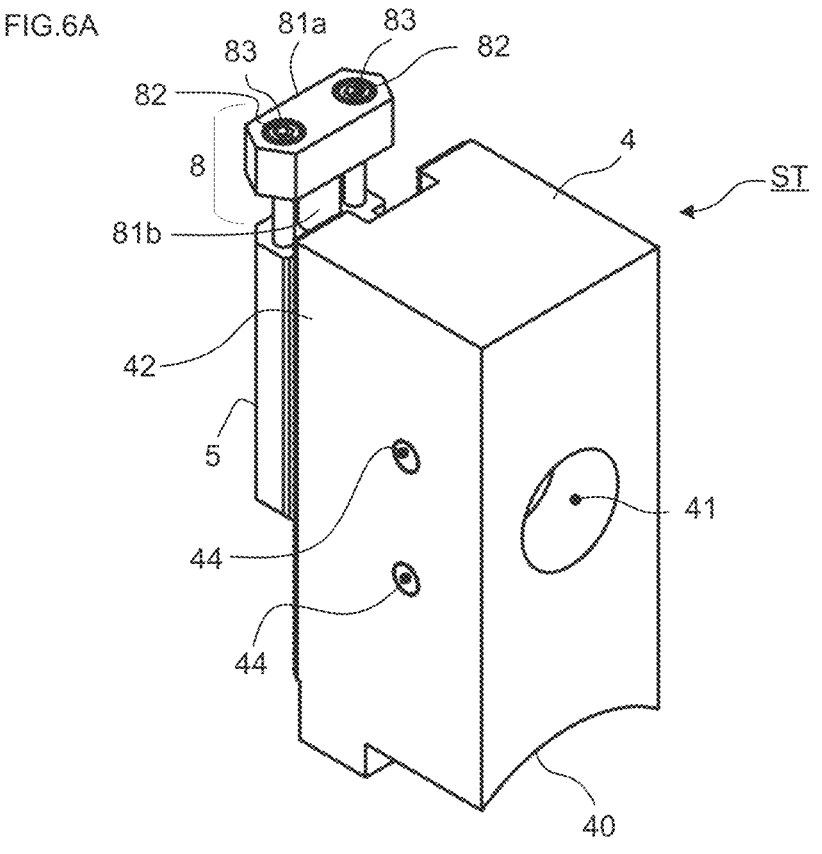
FIG. 6A is a front perspective view of a structure according to the first embodiment.
Figure 6B:
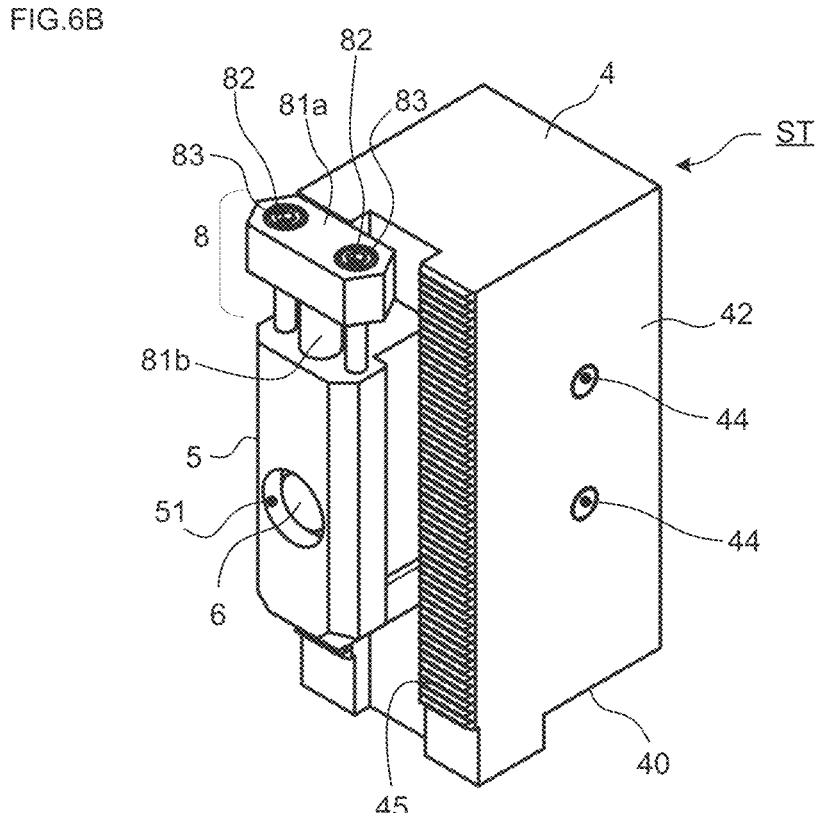
FIG. 6B is a rear perspective view of the structure according to the first embodiment.
Figure 7:
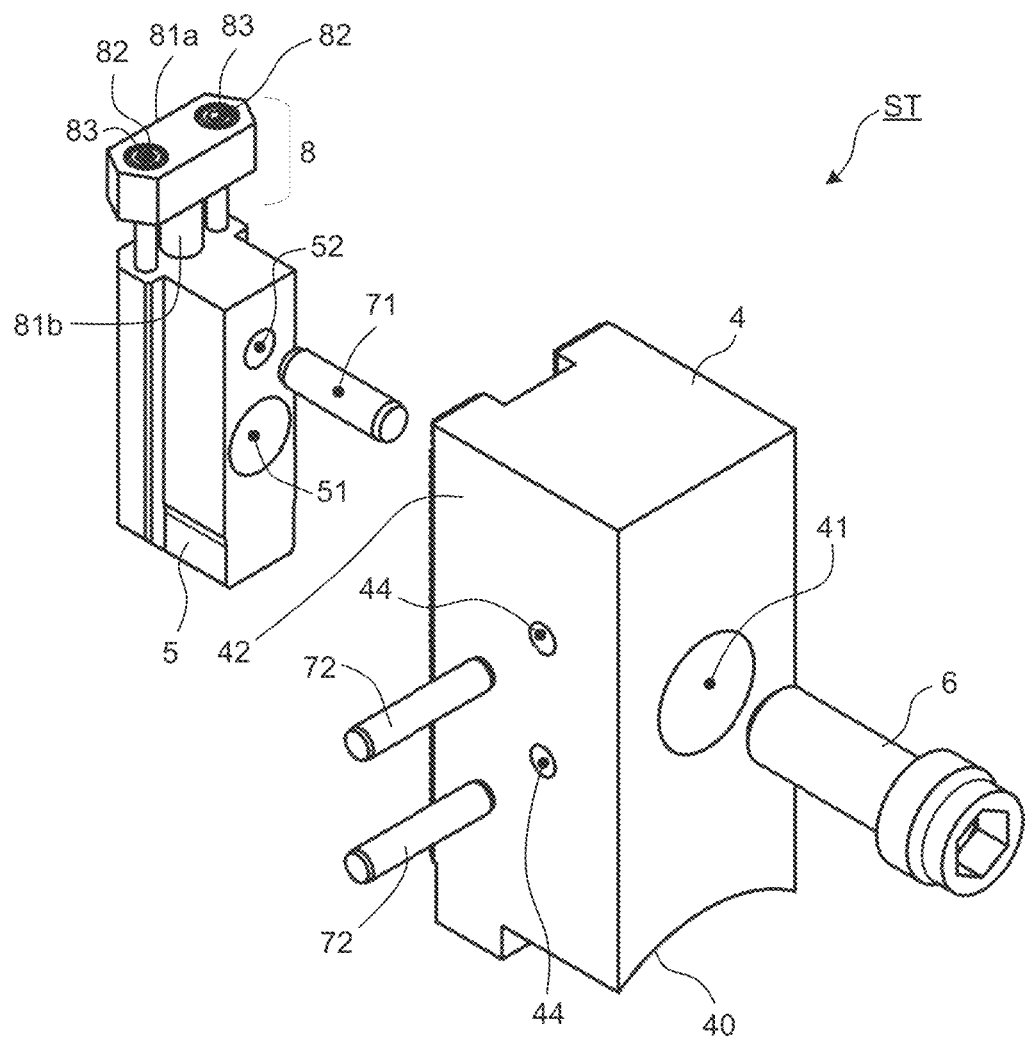
FIG. 7 is a disassembling view of the structure according to the first embodiment.

FIG. 6A is a front perspective view of the structure ST according to the first embodiment, and FIG. 6B is a rear perspective view of the structure ST according to the first embodiment. FIG. 7 is a disassembling view of the structure ST according to the first embodiment. The T-nut 5 is configured to be accommodated in the T-groove 31. Then, a bolt hole 51 is provided on the T-nut 5, and the top jaw bolt 6 is configured to be screwed into the bolt hole 5. In addition, the top jaw bolt 6 is configured to be accommodated in the through hole 41.

In summary, the top jaw 4 is fixed to the master jaw 3 by inserting the T-nut 5 into the T-groove 31 of the master jaw 3, and by inserting the top jaw bolt 6 through the through hole 41 of the top jaw 4 and screwing into the bolt hole 51 of the T-nut 5.

In other words, it should be noted that the top jaw 4 is configured to be attached to/detached from the master jaw 3 by adjusting the screw degree of the T-nut 5 and the top jaw bolt 6. In addition, in such attachment/detachment, the structure ST is treated as an integrated replacement unit.

Figure 8A:
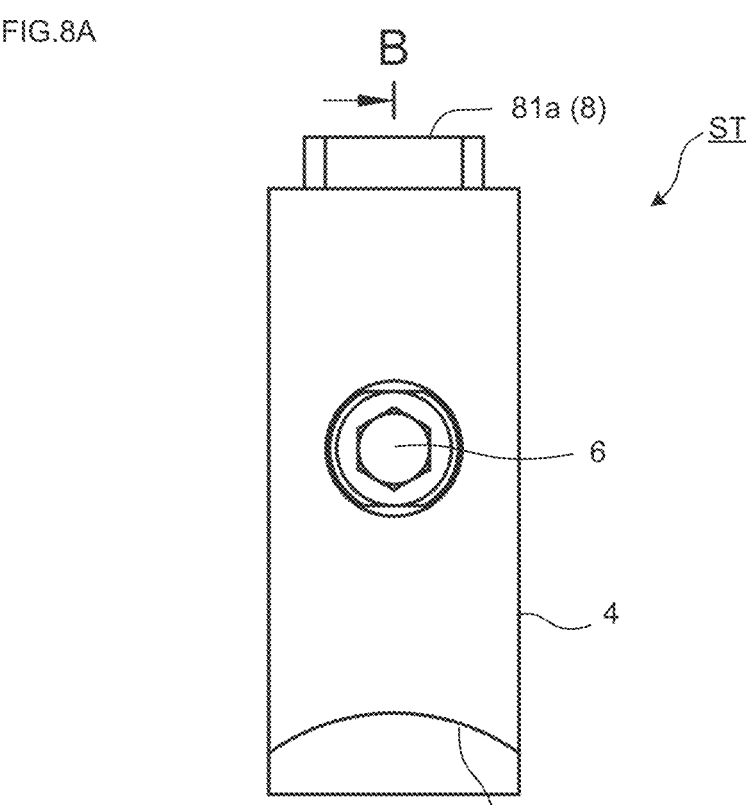
FIG. 8A is a front elevation view of the structure according to the first embodiment.
Figure 8B:
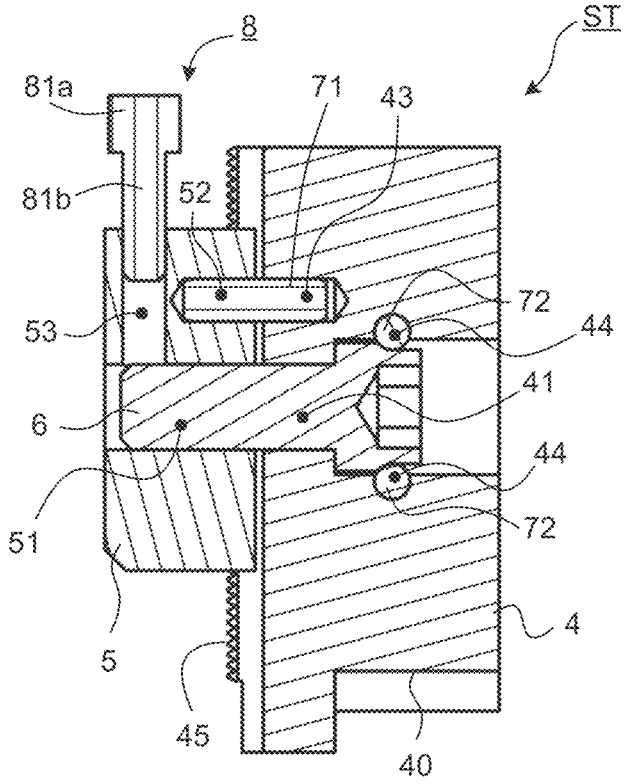
FIG. 8B is a cross-sectional view along line B-B in FIG. 8A.

FIG. 8A shows a front elevation view of the structure ST according to the first embodiment, and FIG. 8B shows a cross-sectional view along line B-B in FIG. 8A. In the structure ST, the top jaw bolt 6 is one, which is integrated as the structure ST. Therefore, when adjusting the screw degree, there is a risk that the top jaw 4 may rotate around the top jaw bolt 6. In order to prevent this situation, in the first embodiment, the structure ST further comprises the anti-rotation member 71. A pin hole 52 is provided on the T-nut 5, and the anti-rotation member 71 is configured to extend across the pin hole 43 and the pin hole 52 provided on the top jaw 4 and the T-nut 5, respectively, thereby the top jaw 4 does not rotate around the top jaw bolt 6 associated with the T-nut 5 when adjusting the screw degree.

Furthermore, in the structure ST, the top jaw 4 further comprises the locking member 72. Then, when the screw degree is loosened, the top jaw bolt 6 presses the top jaw 4 through the locking member 72, thereby the top jaw 4 is configured to be forcibly separated from the master jaw 3. With such configuration, a relative positional relationship of the top jaw 4 associated with the T-nut 5 is stabilized even in a state where the screw degree is loosened to some extent.

The T-nut 5 comprises a bolt hole 53 where a shaft portion 81*b* of the grasping portion 8 described later can be screwed into, and a bolt hole (not shown) where a bolt 83, which serves as a regulation member, can be screwed into.

<Grasping Portion 8>

The grasping portion 8 is provided on at least one of the first and second fixing members (T-nut 5 and top jaw bolt 6). In the first embodiment, as shown in FIGS. 6A and 6B, etc., the grasping portion 8 is provided on the T-nut 5, and is particularly provided in a radial direction outward from the T-nut 5. Thereby, the grasping portion 8 is configured to protrude from the T-groove 31 to outside of the industrial machine (chuck 1) in a state where the T-nut 5 is accommodated in the T-groove 31 (see FIG. 1). More specifically, the grasping portion 8 comprises a flange portion 81*a* protruding to outside of the industrial machine (chuck 1) in a state where the T-nut 5 is accommodated in the T-groove 31. Further, below the flange portion 81*a*, the shaft portion 81*b* having a screw thread is configured.

In particular, it should be noted that the grasping portion 8 is configured to be graspable in such a manner that the structure ST can be smoothly moved in a state where the screw degree is loosened. A supplementary explanation will be given in this regard. In the case of using a general structure without the locking member 72 or the grasping portion 8, an operator grasps the width across flat 42 of the top jaw 4 during attachment/detachment. In such case, as described above, it is difficult to position the T-nut 5 associated with the master jaw 3 in a state where the screw degree is loosened, which places a heavy burden on the operator. On the other hand, the structure ST according to the present embodiment has a grasping portion 8 provided on the T-nut 5. That is, by grasping the grasping portion 8, the operator can smoothly move the structure ST in a state where the screw degree is loosened, thereby enabling stable attachment/detachment.

Figure 9:
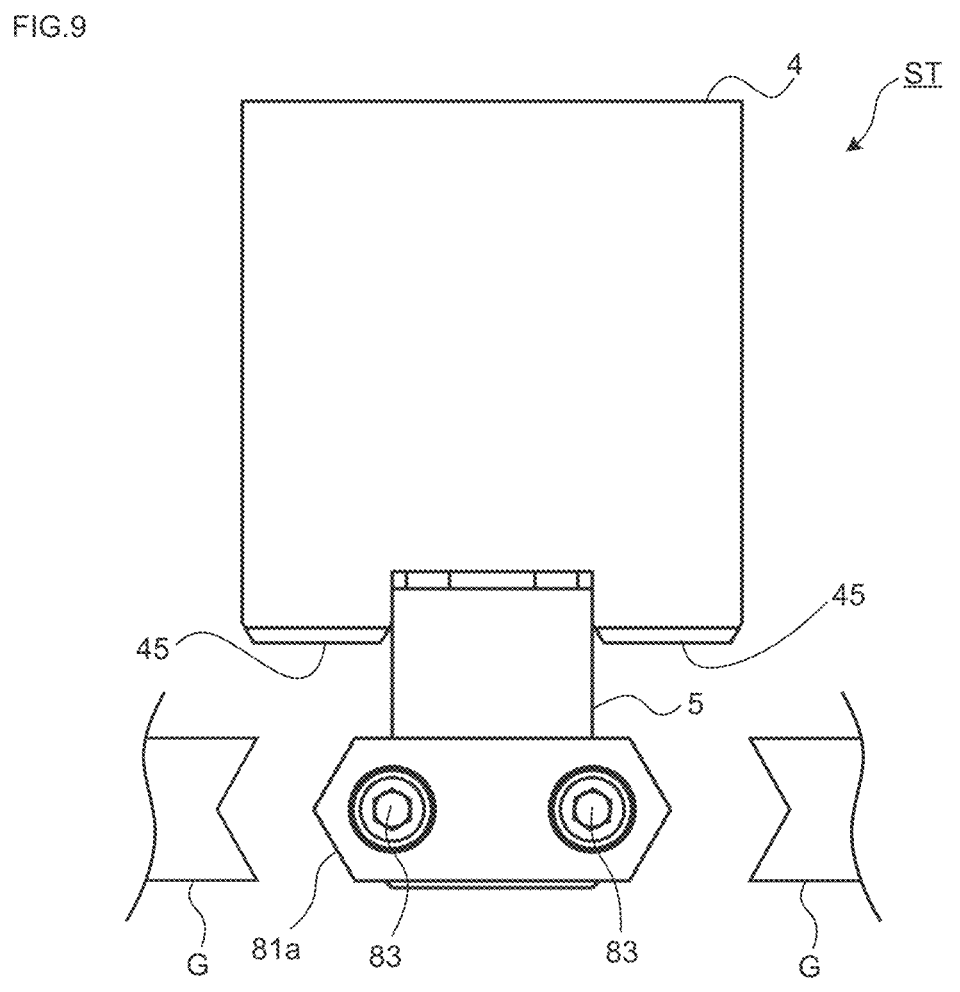

In addition, since stable attachment/detachment is expected as described above, the attachment/detachment work may be carried out automatically by a robot instead of manually by the operator. Here, FIG. 9 shows a top plan view of the structure ST according to the first embodiment. When considering automation by the robot, as shown in the drawing, the flange portion 81*a* may be grasped by a gripper G that matches shape of the flange portion 81*a*. Of course, the shape of the flange portion 81*a* is only an example, and other shapes such as rectangular, circular, oval, or the like may be adopted.

Further, radial position of the flange portion 81*a* can be adjusted. Preferably, the flange portion 81*a* is configured to contact an end surface 32 of the master jaw 3 in a state where the top jaw 4 is fixed to the master jaw 3. Specifically, the shaft portion 81*b* is screwed into the bolt hole 53 until the flange portion 81*a* contacts the end surface 32 of the master jaw 3. Moreover, the bolt 83 is screwed into the bolt hole (not shown) through the through hole 82 to prevent rotation of the shaft portion 81*b*. The number of the bolt 83 is not particularly limited.

It should be noted that since the flange portion 81*a* is contacting the end surface 32 of the master jaw 3, the grasping portion 8 also functions as a positioning mecha- nism. In other words, when the top jaw 4 is attached to the master jaw 3 for the first time, the operator positions the top jaw 4 itself at a predetermined position for machining while grasping the grasping portion 8 (match the serration pitch). At that time, the flange portion 81*a* is temporarily fixed at a position away from the T-nut 5 with a margin in advance in such a manner that the flange portion 81*a* does not contact the end surface 32 of the master jaw 3 until it reaches a predetermined position.

Then, by tightening the top jaw bolt 6, the top jaw 4 is firmly fixed to the master jaw 3. This is referred to as a defined state according to the master jaw 3 and the top jaw 4.

Subsequently, by screwing the shaft portion 81*b* of the grasping portion 8 into the bolt hole 53, the flange portion 81*a* is moved to a position where the flange portion 81*a* contacts the end surface 32 of the master jaw 3. Then, the shaft portion 81*b* is fixed so as to be prevented from rotating by the bolt 83. The flange portion 81*a* serves as a reference for positioning from the next time onward. By the way, in order to fix the bolt 83, it is necessary to align positions of the through hole 82 of the flange portion 81*a* and the bolt hole (not shown) of the T-nut 5. Therefore, with respect to the flange portion 81*a*, it is necessary to move a rotational position back slightly from the state of being in contact with the end surface 32 of the master jaw 3. As a result, a gap will be generated between the flange portion 81*a* and the end surface 32, which is at most the thread pitch of the shaft portion 81*b* divided by the number of bolt holes (not shown) (2 in this embodiment). However, if the gap is sufficiently smaller than serration pitch, even if the top jaw bolt 6 is screwed into the T-nut 5 from the contacted state, the defined state will be reproduced by the engagement of the serration 35 and the serration 45.

In the second and subsequent mounting work of the top jaw 4, the T-nut 5, which has already been positioned in the radial direction of the grasping portion 8, is arranged, and the T-nut 5 is accommodated in the T-groove 31 of the master jaw 3 in a state where the flange portion 81*a* contacts the master jaw 3. Finally, by screwing the top jaw bolt 6 into the bolt hole 51 of the T-nut 5, the top jaw 4 can be fixed to the master jaw 3. At this time, the relative position of the top jaw 4 associated with the master jaw 3 will be the same as that at the initial adjustment.

It is assumed that the top jaw 4 wears out as the chuck 1 is used, the same top jaw 4 is used to machine different type of work, or the grasping surface 40 ages and becomes less accurate, etc. In such case, the top jaw 4 may be machined again and the engagement of the peaks and valleys of the serration 35 and the serration 45 may be changed. Even in this case, the function of the grasping portion 8 as a positioning mechanism can be obtained by adjusting the position of the flange portion 81*a* again.

2. Second Embodiment

In section 2, a structure ST and a chuck 1 according to the second embodiment will be described. However, description of the common parts with the structure ST and the chuck 1 according to the first embodiment will be omitted.

Figures 10A, 10B:
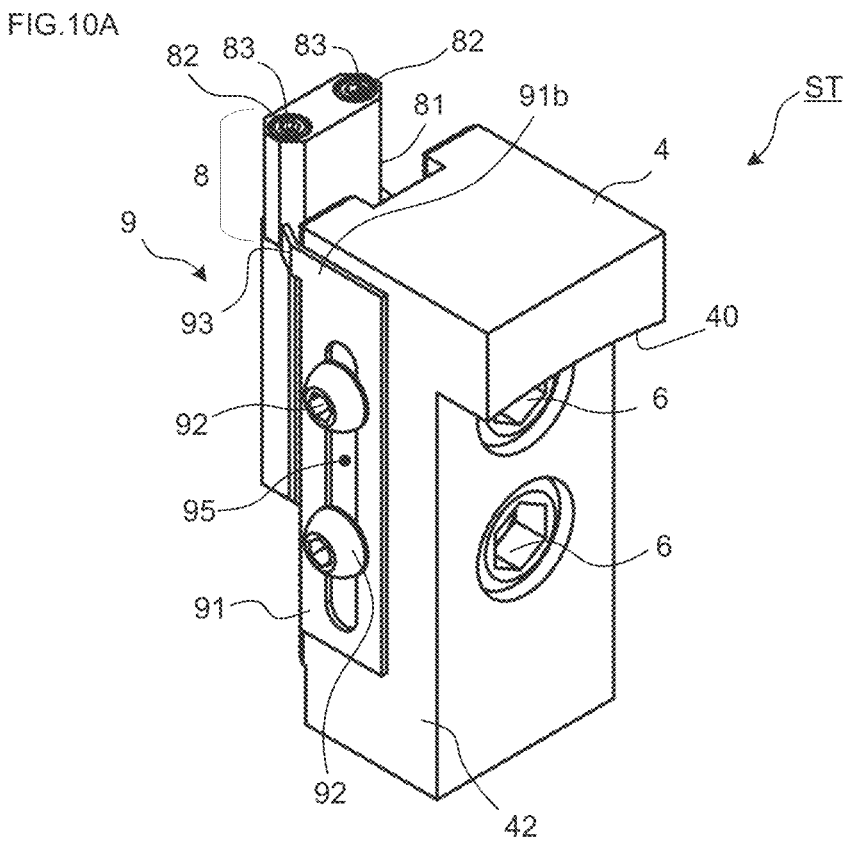
FIG. 10A is a front perspective view of a structure according to a second embodiment.
FIG. 10B is a rear perspective view of the structure according to the second embodiment.

FIG. 10A shows a front perspective view of the structure ST according to the second embodiment, and FIG. 10B shows a rear perspective view of the structure ST according to the second embodiment. The structure ST according to the second embodiment comprises a grasping portion 8 in which a T-nut 5 does not have a flange portion 81*a*. In FIGS. 10A and 10B, although the grasping portion 8 is provided on the T-nut 5 as a different member from the T-nut 5, the T-nut 5 may have a hook shape so as to have the grasping portion 8.

Here in the second embodiment, the grasping portion 8 does not function as the positioning mechanism described in the first embodiment. In this case, it is preferable to separately provide a positioning mechanism 9 as shown in FIGS. 10A and 10B.

The positioning mechanism 9 is arranged on a width across flat 42 of a top jaw 4. The positioning mechanism 9 is configured of a plate member 91 and a bolt 92. The plate member 91 has a long hole 95 and is provided in such a manner that longitudinal direction of the hole 95 matches adjustment direction of the top jaw 4. The plate member 91 is fixed to the top jaw 4 by inserting the bolt 92 through the long hole 95 and screwing it into a bolt hole (not shown) of the top jaw 4 at a desired position.

At an end surface 91*b* of the plate member 91, a plate protruding piece 93 (contacting portion) protrudes in a direction from the top jaw 4 to a master jaw 3, and is configured to contact an end surface 32 of the master jaw 3. In FIGS. 10A and 10B, although the plate protruding piece 93 is formed by being bent with respect to the plate member 91, this is only an example and is not limited to this. Any shape may be used as long as the plate projecting piece 93 is configured to contact the end surface 32 of the master jaw 3.

The structure ST according to the second embodiment does not comprise an anti-rotation member 71. Instead, the top jaw 4 has two through holes 41 through which a top jaw bolt 6 is inserted, and the T-nut 5 has two bolt holes 51 into which the top jaw bolt 6 is screwed. In other words, the structure ST is fixed to the master jaw 3 by using two top jaw bolts 6.

Furthermore, the structure ST according to the second embodiment does not comprise a locking member 72. Instead, the T-nut 5 further has an energization member (not shown) (e.g., an elastic member such as a spring) therein. When screw degree is loosened, the energization member presses the top jaw 4, thereby the top jaw 4 is configured to be forcibly separated from the master jaw 3. That is, the structure ST further comprises an elastic member, the elastic member is configured to energize in such a manner that the top jaw 4 is forcibly separated from the master jaw 3 when the screw degree is loosened. With such configuration, a relative positional relationship of the top jaw 4 associated with the T-nut 5 is stabilized even in a state where the screw degree is loosened to some extent.

Even with such configuration, by grasping the grasping portion 8, the operator can smoothly move the structure ST in a state where the screw degree is loosened, thereby enabling stable attachment/detachment.

3. Third Embodiment

In section 3, a structure ST and a chuck 1 according to the third embodiment will be described. However, description of the common parts with the structure ST and the chuck 1 according to the first and second embodiments will be omitted.

Figure 11A:
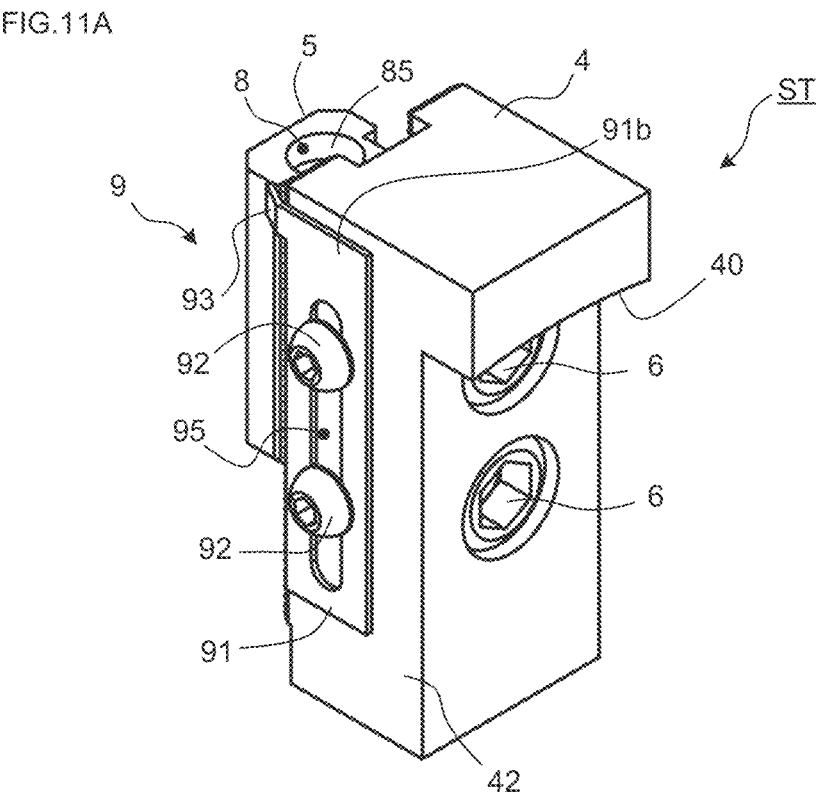
FIG. 11A is a front perspective view of a structure according to a third embodiment.
Figure 11B:
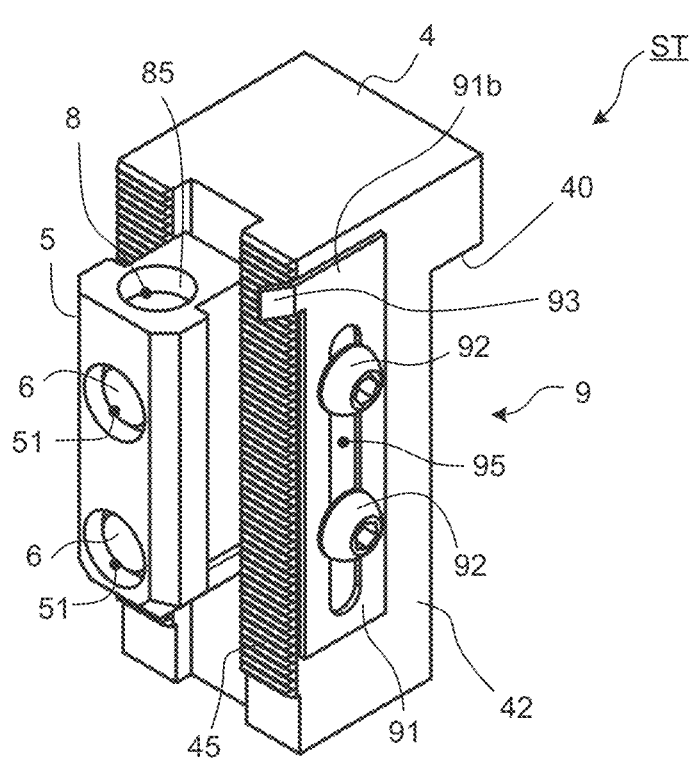
FIG. 11B is a rear perspective view of the structure according to the third embodiment.

FIG. 11A shows a front perspective view of the structure ST according to the third embodiment, and FIG. 11B shows a rear perspective view of the structure ST according to the third embodiment. In the third embodiment, a grasping portion 8 has a different shape from the grasping portion 8 of the structure ST according to the second embodiment. In other words, the grasping portion 8 is a hole provided on a T-nut 5 (at least one of first and second fixing members). The grasping portion 8 is configured to grasp an inner diameter in such a manner that the structure ST can be smoothly moved in a state where screw degree is loosened.

Specifically, a side wall 85 of the hole (grasping portion 8) shown in FIGS. 10A and 10B grasps the inner diameter. Even with such configuration, by grasping the grasping portion 8 with a collet chuck or the like, the structure ST can be smoothly moved in a state where the screw degree is loosened, thereby enabling stable attachment/detachment.

4. Fourth Embodiment

In section 4, a structure ST and a chuck 1 according to the fourth embodiment will be described. However, description of the common parts with the structure ST and the chuck 1 according to the first to third embodiments will be omitted.

Figure 12A:
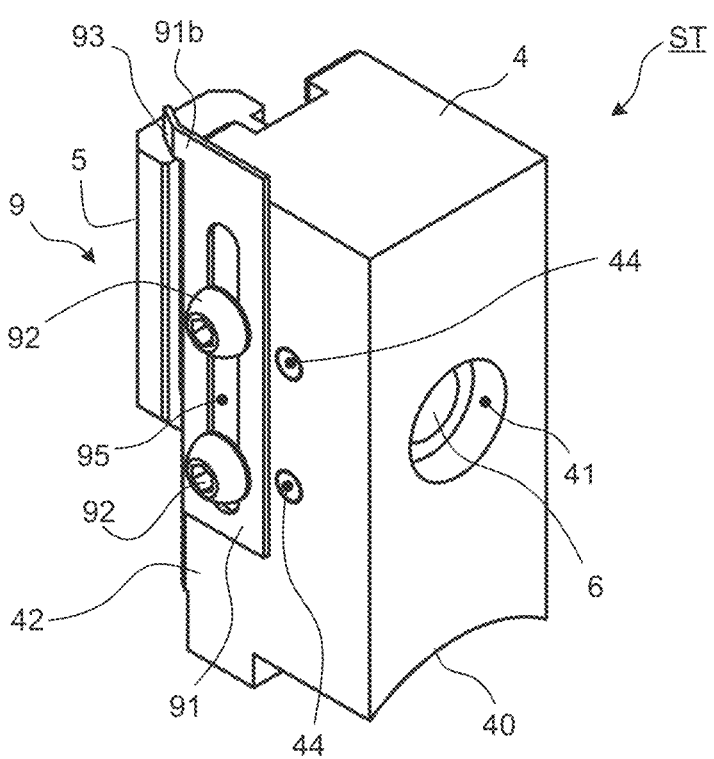
FIG. 12A is a front perspective view of a structure according to a fourth embodiment.
Figure 12B:
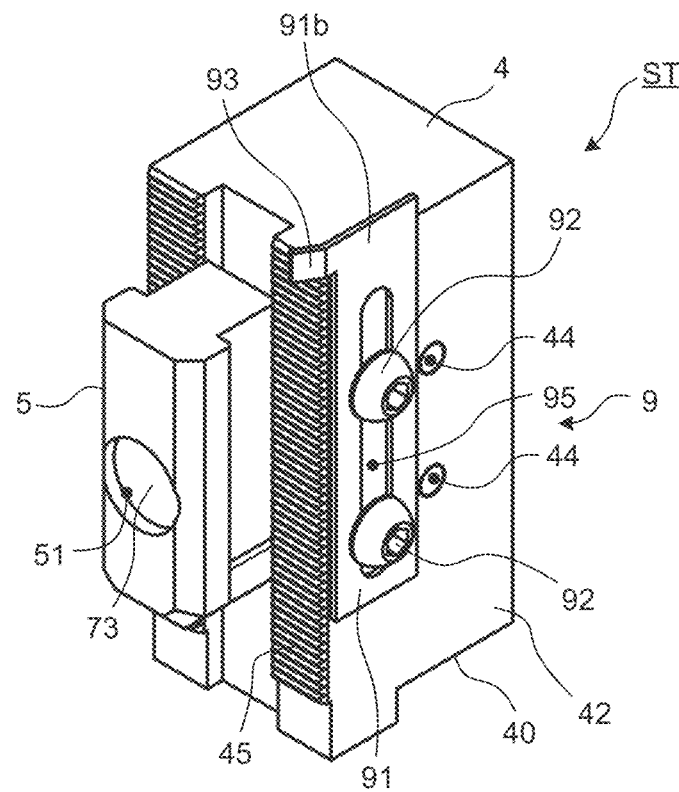
FIG. 12B is a rear perspective view of the structure according to the fourth embodiment.
Figure 13A:
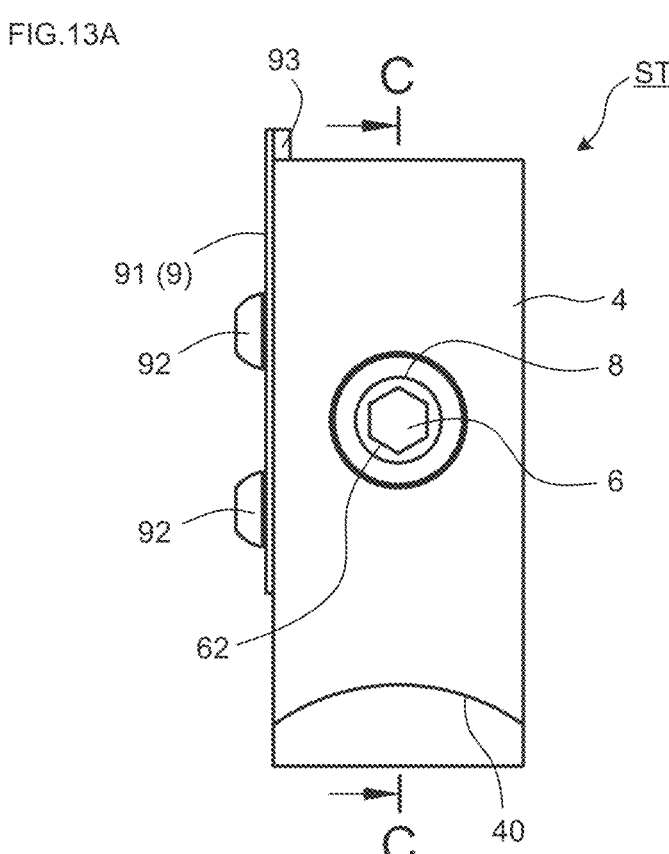
FIG. 13A is a front elevation view of the structure according to the fourth embodiment.
Figure 13B:
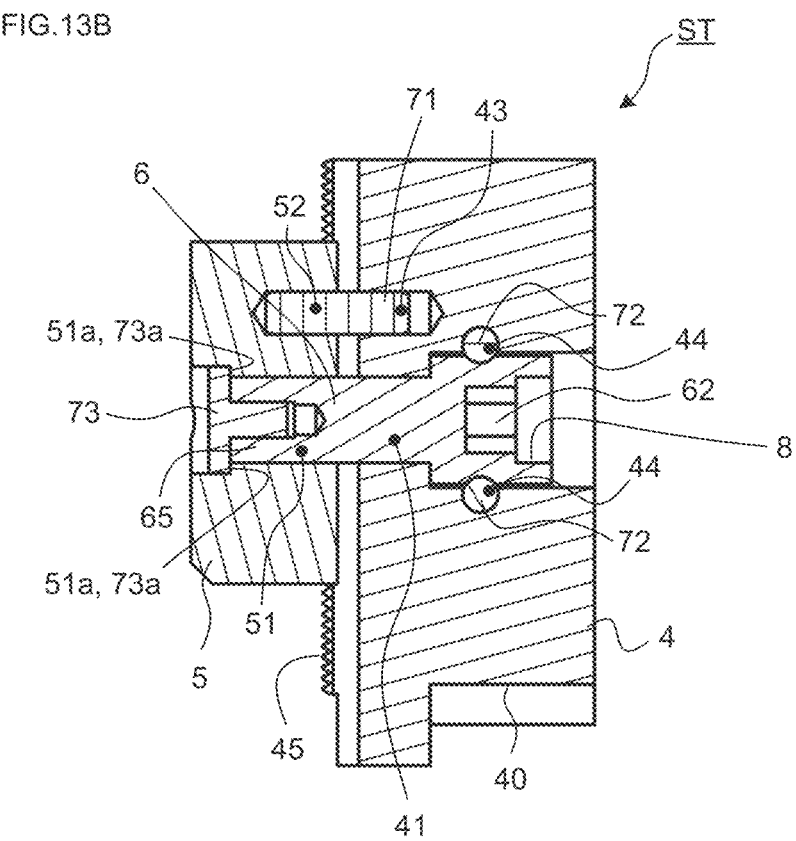
FIG. 13B is a cross-sectional view along line C-C in FIG. 13A.

FIG. 12A is a front perspective view of the structure ST according to the fourth embodiment, and FIG. 12B is a rear perspective view of the structure ST according to the fourth embodiment. FIG. 13A is a front elevation view of the structure ST according to the fourth embodiment. FIG. 13B is a cross-sectional view along line C-C in FIG. 13A. In the fourth embodiment, a grasping portion 8 has a different shape from the grasping portion 8 of the structure ST according to the first embodiment. Specifically, a bolt head 61 of a top jaw bolt 6 has a hexagonal portion 62 on its back side and a grasping portion 8 grasping an inner diameter on its front side. Front and back are design items and may be reversed.

Since the grasping portion 8 does not function as the positioning mechanism as in the first embodiment, the positioning mechanism 9 described in the second and third embodiments is comprised separately.

Furthermore, in the fourth embodiment, the structure ST further comprises a regulation member 73. The regulation member 73 is provided on an end portion 65 of a shaft side of the top jaw bolt 6, and is configured to regulate a separation between a top jaw 4 and a T-nut 5 formed by a locking member 72 to a certain distance or less. Specifically, a contacting portion 73*a* of the regulation member 73 has an outer diameter larger than a bolt hole 51 into which the top jaw bolt 6 is screwed. Therefore, when the top jaw 4 and the T-nut 5 are separated by the certain distance or more, the contacting portion 73*a* of the regulation member 73 comes into contact with a peripheral edge 51*a* of the bolt hole 51 and is regulated (see FIG. 13B). Such regulation allows for positioning without backlash, thus has an advantage to provide the grasping portion 8 on the top jaw bolt 6.

Even with such configuration, by grasping the grasping portion 8 with a collet chuck or the like, the structure ST can be smoothly moved in a state where the screw degree is loosened, thereby enabling stable attachment/detachment.

5. Conclusion

In this way, a structure capable of suppressing difficulty of positioning and smoothly attaching/detaching an upper jig is provided.

The present invention may be implemented in various aspects as described below.

In the structure, the upper jig is configured to be forcibly separated from the attachment/detachment area of the industrial machine when the screw degree is loosened.

In the structure, the upper jig further comprises a locking member, and when the screw degree is loosened, one end of the second fixing member presses the upper jig through the locking member, thereby the upper jig is configured to be forcibly separated from the attachment/detachment area of the industrial machine.

The structure further comprises a regulation member provided on another end of the second fixing member, and configured to regulate a separation between the upper jig and the first fixing member to a certain distance or less.

The structure further comprises an elastic member configured to energize in such a manner that the upper jig is forcibly separated from the attachment/detachment area of the industrial machine when the screw degree is loosened.

In the structure, the first fixing member is a T-nut having an inverted T-shape, and the first space is a T-groove having the inverted T-shape and accommodating the T-nut, the second fixing member is a bolt, and the second space is a through hole allowing the bolt to penetrate, and a bolt hole is provided on the T-nut, and the bolt is configured to be screwed into the bolt hole.

In the structure, the grasping portion is provided on the T-nut, and is configured to protrude from the T-groove to outside of the industrial machine in a state where the T-nut is accommodated in the T-groove.

In the structure, the grasping portion comprises a flange portion protruding to outside of the industrial machine, and the flange portion is configured to contact a part of the attachment/detachment area in a state where the upper jig is fixed to the attachment/detachment area.

In the structure, the bolt being one, the structure further comprises an anti-rotation member configured to extend across the holes provided on the upper jig and the T-nut, respectively, thereby the upper jig does not rotate around the bolt associated with the T-nut when adjusting the screw degree.

In the structure, the grasping portion is a hole provided on at least one of the first and second fixing members, and is configured to grasp an inner diameter in such a manner that the structure can be smoothly moved in a state where the screw degree is loosened.

In the structure, the industrial machine is a chuck grasping a work at front of a body, the attachment/detachment area of the industrial machine is a plurality of master jaws configured to open/close in a radial direction of the chuck, and the upper jig is a plurality of top jaws configured to attach to/detach from the master jaw.

A chuck configured to grasp a work at front of a body, comprising the structure, which is configured to be attachable/detachable.

Of course, the above embodiments are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

REFERENCE SIGNS LIST

1: Chuck
2: Body
3: Master jaw
31: T-groove
32: End surface
4: Top jaw

41: Through hole
42: Width across flat
5: T-nut
51: Bolt hole
6: Top jaw bolt
65: End portion
71: Anti-rotation member
72: Locking member
73: Regulation member
8: Grasping portion
81a: Flange portion
82: Through hole
85: Side wall
ST: Structure

What is claimed is:

1. A chuck configured to grasp a work at front of a body, comprising:

a guide groove provided along a radial direction at a front side of the body;

a master jaw configured to open/close in the radial direction along the guide groove, the master jaw having a first space, and being movable in such a manner that translational movement of a plunger in direction of a rotation axis can be converted into translational movement of the master jaw in the radial direction;

a top jaw having a second space, a T-nut configured to be accommodated in the first space;

a bolt configured to be accommodated in the second space, wherein the first space is a T-groove having an inverted T-shape and accommodating the T-nut, the second space is a through hole allowing the bolt to penetrate, a bolt hole is provided on the T-nut, and the bolt is configured to be screwed into the bolt hole, the top jaw being configured to be attached to/detached from the master jaw by loosening the bolt;

a grasping portion provided on at least one of the T-nut and the bolt, and configured to allow the top jaw, the T-nut and the bolt to be integrally moved radially outward and detached from the T-groove by grasping the grasping portion in a state where the bolt is loosened; and wherein:

the top jaw further comprises a locking member, and when the bolt is loosened, one end of the bolt presses the top jaw through the locking member, thereby the top jaw is configured to be forcibly separated from the master jaw.

2. The chuck according to claim 1, further comprising:

a regulation member provided on another end of the bolt, and configured to regulate a separation between the top jaw and the T-nut to a certain distance or less.

3. The chuck according to claim 1, further comprising:

an elastic member configured to energize in such a manner that the top jaw is forcibly separated from the master jaw when the bolt is loosened.

4. The chuck according to claim 1, wherein:

the grasping portion is provided on the T-nut, and is configured to protrude from the T-groove to outside of the chuck in a state where the T-nut is accommodated in the T-groove.

5. The chuck according to claim 4, wherein:

the grasping portion comprises a flange portion protruding to outside of the chuck, and the flange portion is configured to contact a part of the master jaw in a state where the top jaw is fixed to the master jaw.

6. The chuck according to claim 1, the number of the bolt is one, the structure further comprising:

an anti-rotation member configured to extend across holes provided on the top jaw and the T-nut, respectively, thereby the top jaw does not rotate around the bolt associated with the T-nut when loosening the bolt.

7. The chuck according to claim 1, wherein:

the grasping portion is a hole provided on at least one of the T-nut and bolt, and is configured to grasp an inner diameter in such a manner that the structure can be smoothly moved in a state where the bolt is loosened.

8. The chuck according to claim 1, wherein:

the grasping portion is provided on the T-nut.

9. A chuck configured to grasp a work at front of a body, comprising:

a guide groove provided along a radial direction at a front side of the body;

a master jaw configured to open/close in the radial direction along the guide groove, the master jaw having a first space, and being movable in such a manner that translational movement of a plunger in direction of a rotation axis can be converted into translational movement of the master jaw in the radial direction;

a top jaw having a second space, a T-nut configured to be accommodated in the first space;

a bolt configured to be accommodated in the second space, wherein the first space is a T-groove having an inverted T-shape and accommodating the T-nut, the second space is a through hole allowing the bolt to penetrate, a bolt hole is provided on the T-nut, and the bolt is configured to be screwed into the bolt hole, the top jaw being configured to be attached to/detached from the master jaw by loosening the bolt;

a grasping portion provided on at least one of the T-nut and the bolt, and configured to allow the top jaw, the T-nut and the bolt to be integrally moved radially outward and detached from the T-groove by grasping the grasping portion in a state where the bolt is loosened; and wherein:

the grasping portion is provided on the T-nut, and is configured to protrude from the T-groove to outside of the chuck in a state where the T-nut is accommodated in the T-groove.

10. The chuck according to claim 9, wherein:

the grasping portion comprises a flange portion protruding to outside of the chuck, and the flange portion is configured to contact a part of the master jaw in a state where the top jaw is fixed to the master jaw.

* * * * *